(12) United States Patent
Winter

(10) Patent No.: US 10,535,861 B2
(45) Date of Patent: Jan. 14, 2020

(54) FLOWING ELECTROLYTE BATTERY AND METHOD OF CONTROLLING A FLOWING ELECTROLYTE BATTERY

(71) Applicant: RedFlow R&D Pty Ltd, Seventeen Mile Rocks (AU)

(72) Inventor: Alexander Rudolf Winter, Seventeen Mile Rocks (AU)

(73) Assignee: RedFlow R&D Pty Ltd, Queensland (AU)

( * ) Notice: Subject to any disclaimer, the term of this patent is extended or adjusted under 35 U.S.C. 154(b) by 651 days.

(21) Appl. No.: 14/894,074

(22) PCT Filed: Jul. 10, 2014

(86) PCT No.: PCT/AU2014/000706
§ 371 (c)(1),
(2) Date: Nov. 25, 2015

(87) PCT Pub. No.: WO2015/003212
PCT Pub. Date: Jan. 15, 2015

(65) Prior Publication Data
US 2016/0111706 A1    Apr. 21, 2016

(30) Foreign Application Priority Data

Jul. 10, 2013   (AU) ................................ 2013902539

(51) Int. Cl.
*H01M 2/40*        (2006.01)
*H01M 8/18*        (2006.01)
(Continued)

(52) U.S. Cl.
CPC ............. *H01M 2/40* (2013.01); *H01M 8/188* (2013.01); *H01M 8/20* (2013.01); *H02J 7/0052* (2013.01)

(58) Field of Classification Search
CPC ...................................................... H01M 8/188
See application file for complete search history.

(56) References Cited

U.S. PATENT DOCUMENTS 7,199,550 B2    4/2007  Tsutsui et al.
2006/0251957 A1*  11/2006  Darcy ................... H01M 8/188
                                                                            429/70

(Continued)

FOREIGN PATENT DOCUMENTS

JP          2007188731 A      7/2007

*Primary Examiner* — Robert S Carrico
(74) *Attorney, Agent, or Firm* — Honigman LLP

(57) ABSTRACT

A flowing electrolyte battery can be quickly and safely electrically stripped using electrolyte. The battery includes: a stack comprising a plurality of electrodes; a negative electrolyte circuit coupled to the stack, for circulating negative electrolyte through the stack; a positive electrolyte circuit coupled to the stack, for circulating positive electrolyte through the stack; and a valve coupling the positive electrolyte circuit and the negative electrolyte circuit. The valve includes a closed configuration that prevents flow of electrolyte between the positive electrolyte circuit and the negative electrolyte circuit, and an open configuration that enables flow of electrolyte from at least one of the positive electrolyte circuit and the negative electrolyte circuit to the other of the positive electrolyte circuit and the negative electrolyte circuit. The valve is opened and closed by changes in pressure differences between the positive and the negative electrolyte circuits.

13 Claims, 7 Drawing Sheets

(51) Int. Cl.
*H01M 8/20* (2006.01)
*H02J 7/00* (2006.01)

(56) References Cited

U.S. PATENT DOCUMENTS

| | | | |
|---|---|---|---|
| 2012/0045669 A1 | 2/2012 | Darcy et al. | |
| 2012/0321916 A1* | 12/2012 | Zaffou | H01M 8/04597 429/9 |
| 2016/0013505 A1* | 1/2016 | Darling | H01M 8/188 429/418 |
| 2016/0315337 A1* | 10/2016 | Perry | H01M 8/188 |

* cited by examiner

FLOWING ELECTROLYTE BATTERY AND METHOD OF CONTROLLING A FLOWING ELECTROLYTE BATTERY

FIELD OF THE INVENTION

The present invention relates to flowing electrolyte batteries. In particular, although not exclusively, the invention relates to safety systems and electrolyte management in flowing electrolyte batteries.

BACKGROUND TO THE INVENTION

Flowing electrolyte batteries, such as zinc-bromine batteries, zinc-chlorine batteries, and vanadium flow batteries, offer an important improvement over lead-acid batteries. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal. The useful lifetime of flowing electrolyte batteries is, on the other hand, not affected by deep discharge applications, and the energy to weight ratio of flowing electrolyte batteries is up to six times higher than that of lead-acid batteries.

Referring to FIG. 1, a flow diagram illustrates a basic zinc-bromine flowing electrolyte battery 100, as known according to the prior art. The zinc-bromine battery 100 includes a negative electrolyte circulation path 105 and an independent positive electrolyte circulation path 110. The negative electrolyte circulation path 105 contains zinc ions as an active chemical, and the positive electrolyte circulation path 110 contains bromine ions as an active chemical. The zinc-bromine battery 100 also comprises a negative electrolyte pump 115, a positive electrolyte pump 120, a negative zinc electrolyte (anolyte) tank 125, and a positive bromine electrolyte (catholyte) tank 130.

To obtain high voltage, the zinc-bromine battery 100 further comprises a stack of cells 135 connected in a bipolar arrangement, the stack of cells 135 producing a total voltage higher than that of the individual cells.

For example, a cell 135 comprises half cells 140, 145 including a bipolar electrode plate 155 and a micro porous separator plate 165. The zinc-bromine battery 100 then has a positive polarity end at a collector electrode plate 160, and a negative polarity end at another collector electrode plate 150.

A chemical reaction in a positive half cell, such as the half cell 145, during charging can be described according to the following equation:

$$2Br^- \rightarrow Br_2 + 2e^- \quad \text{Eq. 1}$$

Bromine is thus formed in half cells in hydraulic communication with the positive electrolyte circulation path 110 and is then stored in the positive bromine electrolyte tank 130. A chemical reaction in a negative half cell, such as the half cell 140, during charging can be described according to the following equation:

$$Zn^{2+} + 2e^- \rightarrow Zn \quad \text{Eq. 2}$$

A metallic zinc layer 170 is thus formed on the collector electrode plate 150 in contact with the negative electrolyte circulation path 105.

Chemical reactions in the half cells 140, 145 during discharging are then the reverse of Eq. 1 and Eq. 2.

A problem with the basic zinc-bromine flowing electrolyte battery 100 of the prior art is that it has not generally been possible to strip the battery 100 of its metallic zinc layers 170 sufficiently quickly and safely, and without damaging the battery 100.

Stripping the flowing electrolyte battery 100 can be important, both as a periodic maintenance step to improve the efficiency of the battery 100, and as part of an emergency process of neutralising the stored energy in the battery 100.

Stripping the zinc-bromine flowing electrolyte battery 100 of the prior art using electrical current is both costly, as it generally requires an external maintenance bus, direct current (DC)-DC converter, or stripper circuit, and is prone to damaging the battery 100, and in particular the electrodes of the battery 100.

Furthermore, electrically stripping the zinc-bromine flowing electrolyte battery 100 quickly from full charge is generally unsafe as excessive heat can be generated.

A further problem with the prior art zinc-bromine flowing electrolyte battery 100 is that uneven zinc deposits and dendrites can both reduce efficiency of the battery 100, and even cause damage to cells of the battery 100.

Yet a further problem with the zinc-bromine flowing electrolyte battery 100 is that overcharging, for example due to a fault in an electrical charging system, can severely damage the battery 100.

There is therefore a need to overcome or alleviate many of the above discussed problems associated with flowing electrolyte batteries of the prior art.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to one aspect, the present invention resides in a flowing electrolyte battery, comprising:

a stack comprising a plurality of electrodes;

a negative electrolyte circuit coupled to the stack, for circulating negative electrolyte through the stack;

a positive electrolyte circuit coupled to the stack, for circulating positive electrolyte through the stack; and a valve coupling the positive electrolyte circuit and the negative electrolyte circuit;

wherein the valve includes a closed configuration that prevents flow of electrolyte between the positive electrolyte circuit and the negative electrolyte circuit, and an open configuration that enables flow of electrolyte from at least one of the positive electrolyte circuit and the negative electrolyte circuit to the other of the positive electrolyte circuit and the negative electrolyte circuit; and wherein the negative electrolyte circuit operates at a different pressure than the positive electrolyte circuit during an electrical charge or discharge operation, and the valve is opened and closed by changes in pressure differences between the positive and the negative electrolyte circuits.

Preferably, in the open configuration, the valve enables flow of electrolyte from the positive electrolyte circuit to the negative electrolyte circuit.

Preferably, in the open configuration, the valve prevents flow of electrolyte from the negative electrolyte circuit to the positive electrolyte circuit.

Preferably, the valve comprises a check-valve. Alternatively, the valve is electrically actuated.

Preferably, the flowing electrolyte battery further comprises a pressure regulator, for controlling a pressure of at least one of the positive electrolyte circuit and the negative electrolyte circuit.

Preferably, during an electrical charge or discharge operation the negative electrolyte circuit is configured to operate at a higher pressure than the positive electrolyte circuit, and the valve is configured such that it is closed by the higher pressure of the negative electrolyte circuit.

Preferably, the positive electrolyte circuit and the negative electrolyte circuit comprise positive and negative electrolyte reservoirs respectively, wherein the flowing electrolyte battery further comprises an overflow channel between the positive and negative electrolyte reservoirs that enables electrolyte to overflow from one of the positive and the negative electrolyte reservoirs to another of the positive and the negative electrolyte reservoirs.

Preferably, the flowing electrolyte battery further comprises a charging module, for charging the flowing electrolyte battery.

Preferably, the flowing electrolyte battery includes a battery control module, for detecting an overcharging of the flowing electrolyte battery, the module configured to open the valve when overcharging is detected. Suitably, the battery control module is configured to open the valve by changing a pressure in one or more of the negative electrolyte circuit and the positive electrolyte circuit.

Preferably, the battery control module is configured to detect an overcharge current, and control the valve to chemically discharge the flowing electrolyte battery at a rate corresponding to the overcharge current.

Preferably, the flowing electrolyte battery further comprises a battery control module, for electrochemically polishing the stack of the flowing electrolyte battery.

Preferably, the battery control module is configured to periodically open the valve to chemically discharge the battery partially.

Preferably, the flowing electrolyte battery comprises a Zinc-Bromine flowing electrolyte battery.

According to a second aspect, the invention resides in a method of controlling a flowing electrolyte battery comprising an electrode stack, a negative electrolyte circuit and a positive electrolyte circuit and a valve between the positive electrolyte circuit and the negative electrolyte circuit, the method comprising:

circulating the positive electrolyte through the stack via the positive electrolyte circuit;

circulating the negative electrolyte through the stack via the negative electrolyte circuit;

opening the valve to enable the positive electrolyte to flow from the positive electrolyte circuit to the negative electrolyte circuit; and circulating a mixture of positive and negative electrolyte through the stack via the negative electrolyte circuit; and
    wherein opening the valve is performed by:
    operating the positive electrolyte circuit at a first pressure; and
    operating the negative electrolyte circuit at a second pressure that is different from the first pressure.

Preferably, the method further comprises:

determining that the flowing electrolyte battery should be at least partly discharged;

wherein the valve is opened subsequent to determining that the flowing electrolyte battery should be at least partly discharged.

Preferably, determining that the flowing electrolyte battery should be at least partly discharged comprises at least one of:

detecting an error in the flowing electrolyte battery;

detecting an overcharging of the flowing electrolyte battery;

determining that a threshold for electrochemical polishing of the flowing electrolyte battery has been reached.

Preferably, the first pressure is greater than the second pressure.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
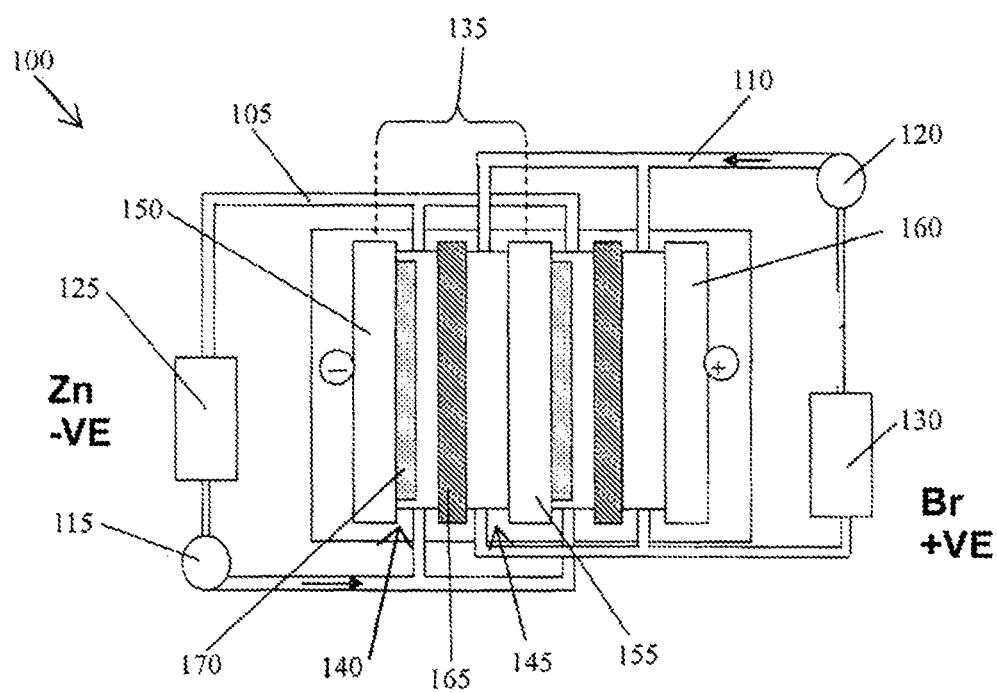
FIG. 1 illustrates a basic zinc-bromine flowing electrolyte battery, according to the prior art.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise flowing electrolyte batteries and methods. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the present invention resides in a flowing electrolyte battery, comprising: a stack comprising a plurality of electrodes; a negative electrolyte circuit coupled to the stack, for circulating negative electrolyte through the stack; a positive electrolyte circuit coupled to the stack, for circulating positive electrolyte through the stack; and a valve coupling the positive electrolyte circuit and the negative electrolyte circuit. The valve includes a closed configuration, which prevents flow of electrolyte between the positive electrolyte circuit and the negative electrolyte circuit, and an open configuration, which enables flow of electrolyte from at least one of the positive electrolyte circuit and the negative electrolyte circuit to another of the positive electrolyte circuit and the negative electrolyte circuit.

Advantages of certain embodiments of the present invention include an ability to quickly and safely strip a flowing electrolyte battery. In particular, the stripping can be achieved without any of an external maintenance bus, direct current (DC)-DC converter, or stripper circuit. According to some embodiments incorporated into a zinc-bromine battery, the active ingredients are mixed in the zinc side of the cell stack and the zinc tank by pumping bromine electrolyte across from the bromine tank to the zinc tank leading to a self-discharge of the battery to strip the last of the zinc out of the stack.

According to certain embodiments, the present invention is more robust and reduces a risk of damage to the flowing electrolyte battery, as current is not required to electrically strip the battery.

According to some embodiments, the present invention can be safely used from any state of charge of the flowing electrolyte battery, including a rapid full discharge of a fully charged battery.

In addition to stripping the battery, the present invention can be used to electrochemically polish the battery, e.g. polishing a zinc plating of a zinc-bromine battery, to reduce the effect of uneven deposits and dendrites on the plating.

According to certain embodiments, the discharge of the battery is controllable, enabling a desired amount of discharge or polishing to occur. In particular, a battery can be discharged by only a small amount, without otherwise affecting the function of the battery.

Furthermore, certain embodiments of the present invention enable overcharging to be prevented, for example if a fault has occurred in an electrical charging system, without fully discharging the battery.

Figure 2:
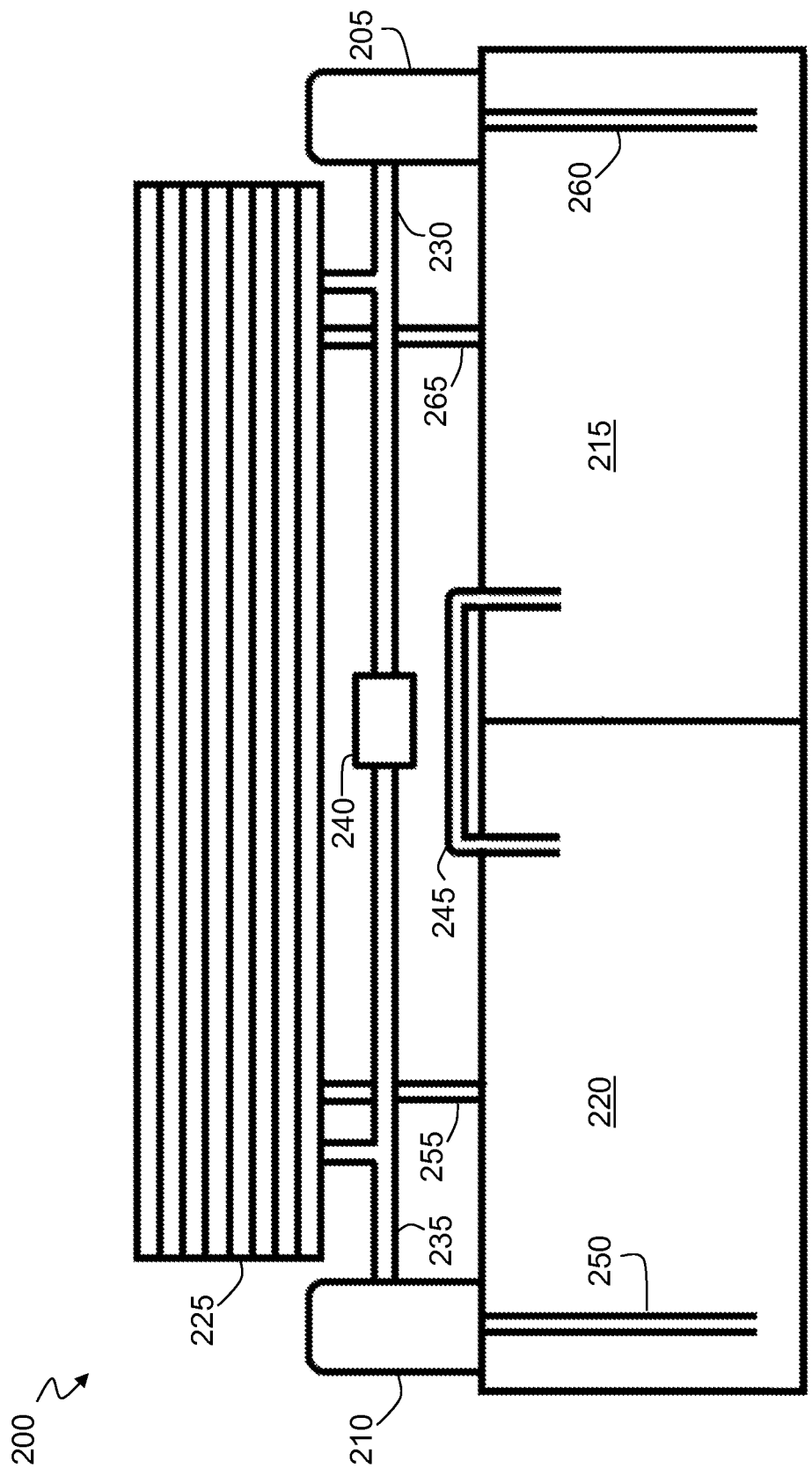
FIG. 2 illustrates a side cross sectional view of a flowing electrolyte battery, according to an embodiment of the present invention.

FIG. 2 illustrates a side cross sectional view of a flowing electrolyte battery 200, according to an embodiment of the present invention. The flowing electrolyte battery 200 can, for example, comprise a zinc-bromine flowing electrolyte battery.

Similar to the flowing electrolyte battery 100 of FIG. 1, the flowing electrolyte battery 200 includes a negative electrolyte pump 205, a positive electrolyte pump 210, a negative electrolyte (anolyte) tank 215, and a positive electrolyte (catholyte) tank 220. The negative electrolyte (anolyte) tank 215 is coupled to a cell stack 225 via the negative electrolyte pump 205 and a negative electrolyte circulation path 230. The positive electrolyte (catholyte) tank 220 is coupled to the cell stack 225 via the positive electrolyte pump 210 and a positive electrolyte circulation path 235.

The positive electrolyte circulation path 235 and the negative electrolyte circulation path 230 are selectively coupled by a valve 240. The valve 240 isolates the positive electrolyte circulation path 235 and the negative electrolyte circulation path 230 in a first configuration; and the valve 240 enables flow between the positive electrolyte circulation path 235 and the negative electrolyte circulation path 230 in a second configuration.

According to certain embodiments, the valve 240 is a check valve that prevents flow from one of the positive electrolyte circulation path 235 and the negative electrolyte circulation path 230 to the other of the positive electrolyte circulation path 235 and the negative electrolyte circulation path 230. In such case, the valve 240 can be used to isolate the positive electrolyte circulation path 235 and the negative electrolyte circulation path 230 by maintaining a first pressure differential between the positive electrolyte circulation path 235 and the negative electrolyte circulation path 230. The valve 240 can then be opened in one direction by changing the pressure differential between the positive electrolyte circulation path 235 and the negative electrolyte circulation path 230.

Furthermore, the flowing electrolyte battery 200 includes an overflow tube 245, for enabling electrolyte to overflow from one of the positive electrolyte circulation path 235 and the negative electrolyte circulation path 230 to the other of the positive electrolyte circulation path 235 and the negative electrolyte circulation path 230. This can be particularly important when the valve 240 is open, as fluid is then able to flow from one of the positive electrolyte circulation path 235 and the negative electrolyte circulation path 230 to the other of the positive electrolyte circulation path 235 and the negative electrolyte circulation path 230, which will eventually result in one of the positive electrolyte tank 220 or the negative electrolyte tank 215 to fill up and potentially overflow.

During a normal charge or discharge operation, the positive electrolyte pump 210 draws positive electrolyte from the positive electrolyte (catholyte) tank 220 using a positive electrolyte collection tube 250, and pumps it under pressure through the cell stack 225, and back into the positive electrolyte (catholyte) tank 220 using a positive electrolyte return tube 255.

Simultaneously, the negative electrolyte pump 205 draws negative electrolyte from the negative electrolyte (anolyte) tank 215 using a negative electrolyte collection tube 260, and pumps it under pressure through the cell stack 225, and back into the negative electrolyte (anolyte) tank 215 using a negative electrolyte return tube 265.

The valve 240 is closed in such normal charge or discharge operations, and thus flow of electrolyte between the positive electrolyte circulation path 235 and the negative electrolyte circulation path 230 is prevented.

Chemical reactions take place in the cell stack 225 during charging or discharging, similar or identical to those described above in the context of FIG. 1.

During certain other operations, such as in the case of a fault in the flowing electrolyte battery 200, the valve 240 is opened in at least one direction, and thus flow of electrolyte between the positive electrolyte circulation path 235 and the negative electrolyte circulation path 230 is enabled. The positive electrolyte pump 210 and the negative electrolyte pump 205 continue to pump electrolyte through the cell stack 225, as described above, although a mixing of positive electrolyte and negative electrolyte occurs, by means of the valve 240, in at least one of the positive electrolyte circulation path 235 and the negative electrolyte circulation path 230.

As a mixture of positive electrolyte and negative electrolyte is pumped through the cell stack 225, the cell stack 225 can be chemically stripped and/or the battery 200 can be neutralised.

As discussed above, according to certain embodiments the valve 240 is a check valve. In such case, during normal charge and discharge operations, one of the negative electrolyte pump 205 and the positive electrolyte pump 210 operates at a higher pressure than the other in order to prevent flow of electrolyte between the positive electrolyte circulation path 235 and the negative electrolyte circulation path 230, by forcing the valve 240 to remain closed. A flow direction of the valve 240 defines what pressure differential is required between the positive electrolyte circulation path 235 and the negative electrolyte circulation path 230 to open and close the valve 240.

In particular, the valve 240 in the form of a check valve is advantageously configured to prevent negative electrolyte (e.g. Zinc electrolyte) from entering the positive electrolyte circulation path 235, and enable flow of positive electrolyte (e.g. Bromine electrolyte) to the negative electrolyte circulation path 230 when the pressure from the negative electrolyte pump 205 is greater than the pressure from the positive electrolyte pump 210.

As will be readily understood by the skilled addressee, a pressure differential at the valve 240 will determine if the valve 240 opens and closes. In many cases, this pressure differential may correspond to a pressure differential between the negative electrolyte pump 205 and the positive electrolyte pump 210. However, in other cases a more detailed analysis of pump pressures may be required to estimate a pressure differential at the valve 240.

Figure 3:
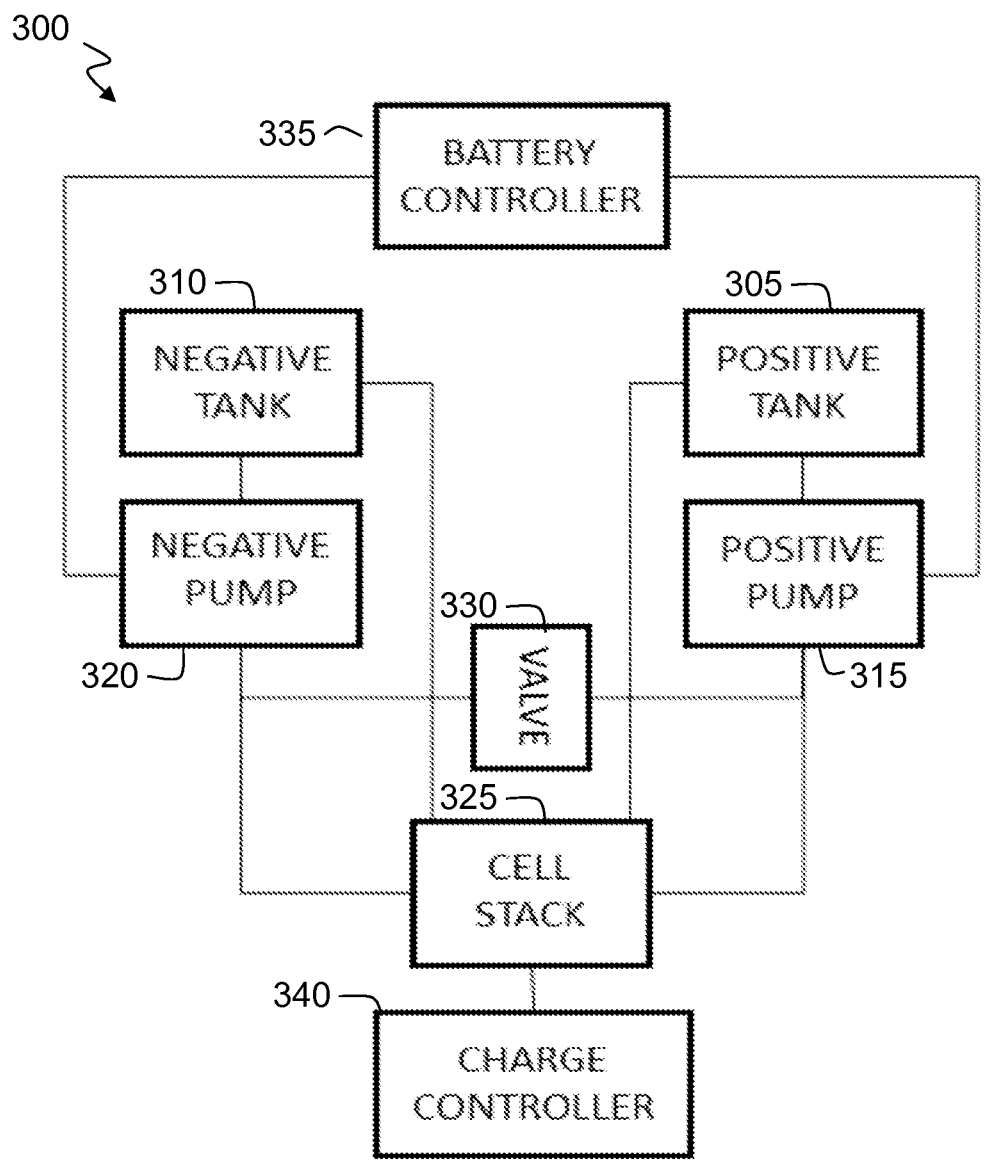
FIG. 3 illustrates a schematic overview of a flowing electrolyte battery, according to an embodiment of the present invention.

FIG. 3 illustrates a schematic overview of a flowing electrolyte battery 300, according to another embodiment of the present invention. The flowing electrolyte battery 300 can be similar to the flowing electrolyte battery 200 of FIG. 2.

The flowing electrolyte battery 300 includes a positive electrolyte tank 305, a negative electrolyte tank 310, a positive electrolyte pump 315, and a negative electrolyte pump 320, similar to the positive electrolyte (catholyte) tank 220, the negative electrolyte (anolyte) tank 215, the positive electrolyte pump 210 and the negative electrolyte pump 205, respectively. The flowing electrolyte battery 300 further includes a cell stack 325, and a valve 330, similar to the cell stack 225 and valve 240, respectively.

The valve 330 is a check valve that prevents negative electrolyte (e.g. Zinc electrolyte) from flowing to the positive electrolyte side of the cell stack 325, but allows the positive electrolyte (e.g. Bromine electrolyte) to flow to the positive electrolyte side of the cell stack 325 under certain conditions.

A battery controller 335 is coupled to the positive electrolyte pump 315 and to the negative electrolyte pump 320, and regulates a pressure of the respective pumps 315, 320. In normal charge and discharge operations, the battery controller 335 maintains a pressure of an output of the negative electrolyte pump 320 to be higher than that of a pressure of an output of the positive electrolyte pump 315. This prevents the valve 330 from opening.

A charge controller 340 is used to control charging and discharging of the battery 300, which can, for example, include a bi-directional inverter (not shown). In such case, the charge controller 340 can be used to charge the battery 300 from a power grid or a local power source, or alternatively return power to the grid or power local devices.

In particular, the battery 300 can be charged and discharged by adjusting the bidirectional inverter, such that either a positive or negative potential difference between the battery 300 and the grid is created. Those skilled in the art will understand that in some embodiments other equivalent hardware, such as a battery charger and a resistive load, can be used to charge or discharge the battery 300.

In case of an error on the battery 300, for example, it may be desirable to strip charge from the battery 300. In such case, the battery controller 335 lowers the pressure of the negative electrolyte pump 320 to below that of the positive electrolyte pump 315 so that the positive electrolyte can cross over through the valve 330, and thus cause a rapid electrochemical stripping of the battery electrodes. This permits a stripping of the battery 300 without use of any of the charge controller 340, an external maintenance bus, a direct current (DC)-DC converter, or other stripper circuit. Further, as the battery is chemically stripped, there is no strip current which has the potential to damage electrodes of the cell stack 325.

The battery 300 can be stripped in the manner described above from any state of charge, including 100% charge, rapidly to a zero charge. The discharge can be controlled by the battery controller 335 such that heat can be transferred from the battery 300, for example using a cooling circuit, at the rate the heat is generated.

It can also be advantageous to electrochemically polish the electrodes of the cell stack 325. This process is similar to the stripping process described above, but for purposes of polishing only a limited amount of positive electrolyte is allowed to cross over through the valve 330. In such a way, uneven deposits and dendrites, which can puncture electrodes, are removed from the battery 300. In such case, the controller 335 advantageously lowers the pressure of the negative electrolyte pump 320 only for a short period of time. By measuring a time the valve 330 is opened, it is possible to estimate an amount of positive electrolyte that has crossed the valve 330, and hence the amount of polishing that has been performed.

If overcharging of the battery 300 occurs, for example due to an error in the charge controller 340, the battery controller 335 can partially strip the battery 300 to limit overcharging. In such a case, the battery controller 335 can configure the positive electrolyte pump 315 and the negative electrolyte pump 320 such that a pressure differential results in an electrochemical discharge at a rate equivalent to the overcharge, thus converting the excess energy to heat and preventing the more damaging effects of overcharging the battery 300.

According to certain embodiments, the flow of electrolytes across the valve 330 is limited, to enable full discharge of the battery 300 from high states of charge, without generating excess heat. In such case, the flow can be controlled by the battery controller 335 through pressure differences, by opening and closing the valve 330 periodically, or by including a physical flow restrictor near the valve 330.

Figure 4:
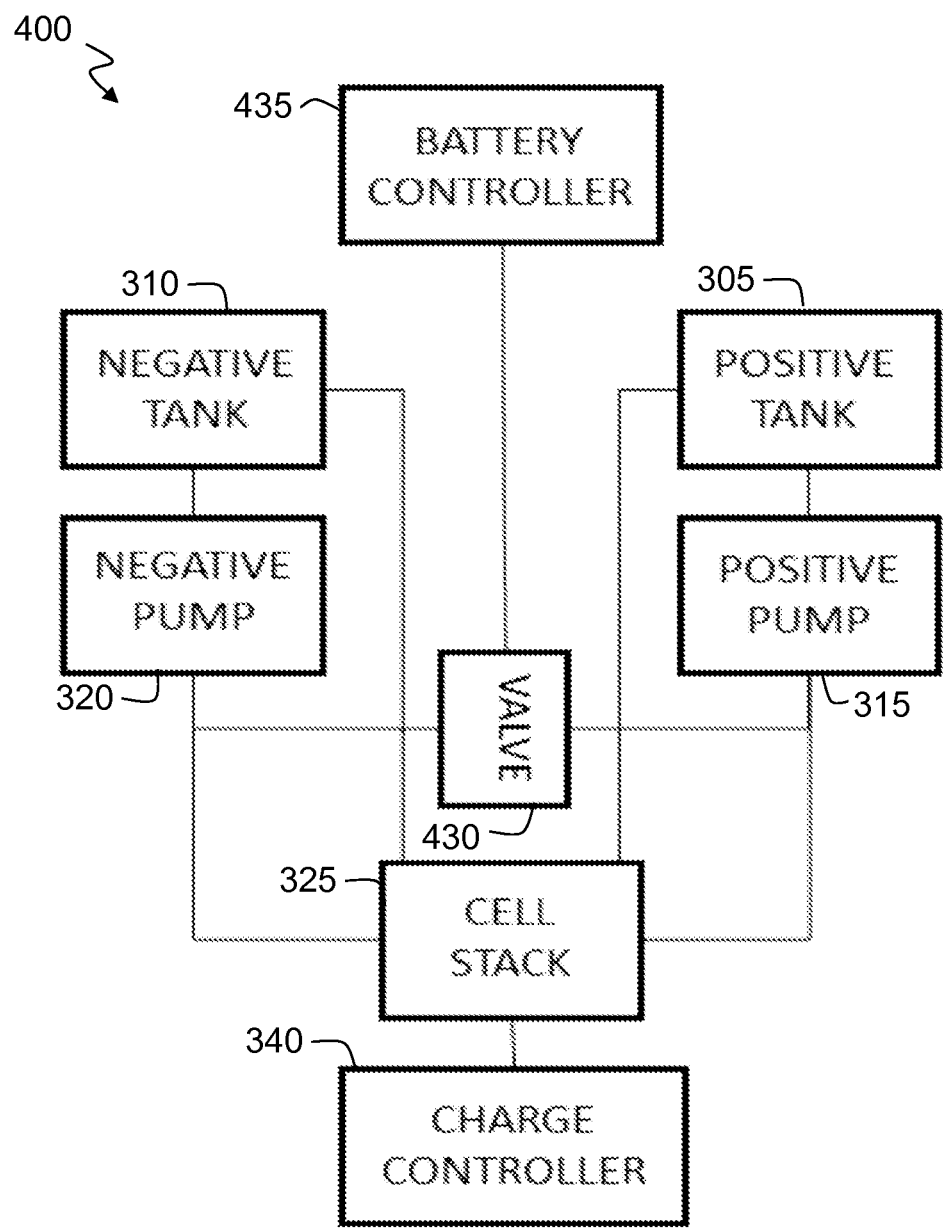
FIG. 4 illustrates a schematic overview of a flowing electrolyte battery, according to another embodiment of the present invention.

FIG. 4 illustrates a schematic overview of a flowing electrolyte battery 400, according to an embodiment of the present invention. The flowing electrolyte battery 400 is similar to the flowing electrolyte battery 300 of FIG. 3, with the exception of the battery controller 335 and valve 330.

The flowing electrolyte battery 400 includes a battery controller 435 and valve 430, similar to the battery controller 335 and valve 330 of FIG. 3, but wherein the battery controller 435 controls the valve 430 directly, rather than through the positive and negative electrolyte pumps 315, 320.

In particular, the battery controller 435 is coupled to the valve 430, and can control opening and closing of the valve 430. The valve 430 can be electrically actuated, for example, or be physically actuated by an external solenoid or similar device.

The valve 430 or battery 400 otherwise can include a one way valve, to prevent flow of electrolyte in one direction. Alternatively, one of the positive electrolyte pump 315 and the negative electrolyte pump 320 can be operated at a higher pressure to force the flow of electrolyte across the valve 430 in a single direction.

Figure 5:
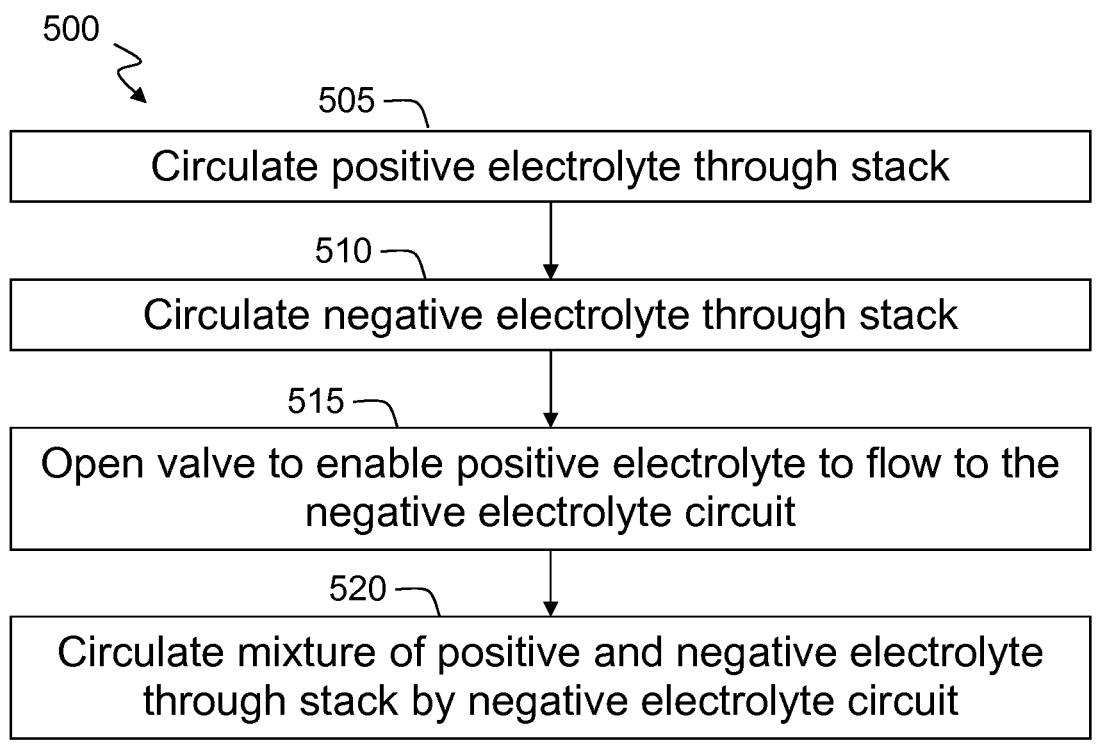
FIG. 5 illustrates a method of controlling a flowing electrolyte battery, according to an embodiment of the present invention.

FIG. 5 illustrates a method 500 of controlling a flowing electrolyte battery, according to an embodiment of the present invention. The flowing electrolyte battery can be similar or identical to any of the flowing electrolyte batteries 200, 300, 400 of FIG. 2, FIG. 3 or FIG. 4 and comprises an electrode stack, a negative electrolyte circuit, a positive electrolyte circuit and a valve between the positive electrolyte circuit and the negative electrolyte circuit.

In step 505, positive electrolyte is circulated through the stack by the positive electrolyte circuit, and in step 510 negative electrolyte is circulated through the stack by the negative electrolyte circuit. This enables a voltage drop to occur across the stack, and is used in normal charge and discharge operations.

Steps 505 and 510 are advantageously performed simultaneously, however the skilled addressee will understand that the positive electrolyte need not be pumped through the circuit at the same rate as the negative electrolyte, and that flow in one or more of the positive electrolyte circuit and the negative electrolyte circuit can be temporarily paused during normal operation.

In step 515 the valve is opened to enable the positive electrolyte to flow from the positive electrolyte circuit to the negative electrolyte circuit. As discussed above, this can be achieved by operating the positive electrolyte circuit at a higher pressure than the negative electrolyte circuit when a check valve is used, or by other suitable means.

In step 520, a mixture of positive and negative electrolyte is circulated through the stack by the negative electrolyte circuit. This will cause an electrochemical stripping of the stack, and in the case of a Zinc-Bromine battery, cause stripping of plated zinc from the stack.

Figure 6:
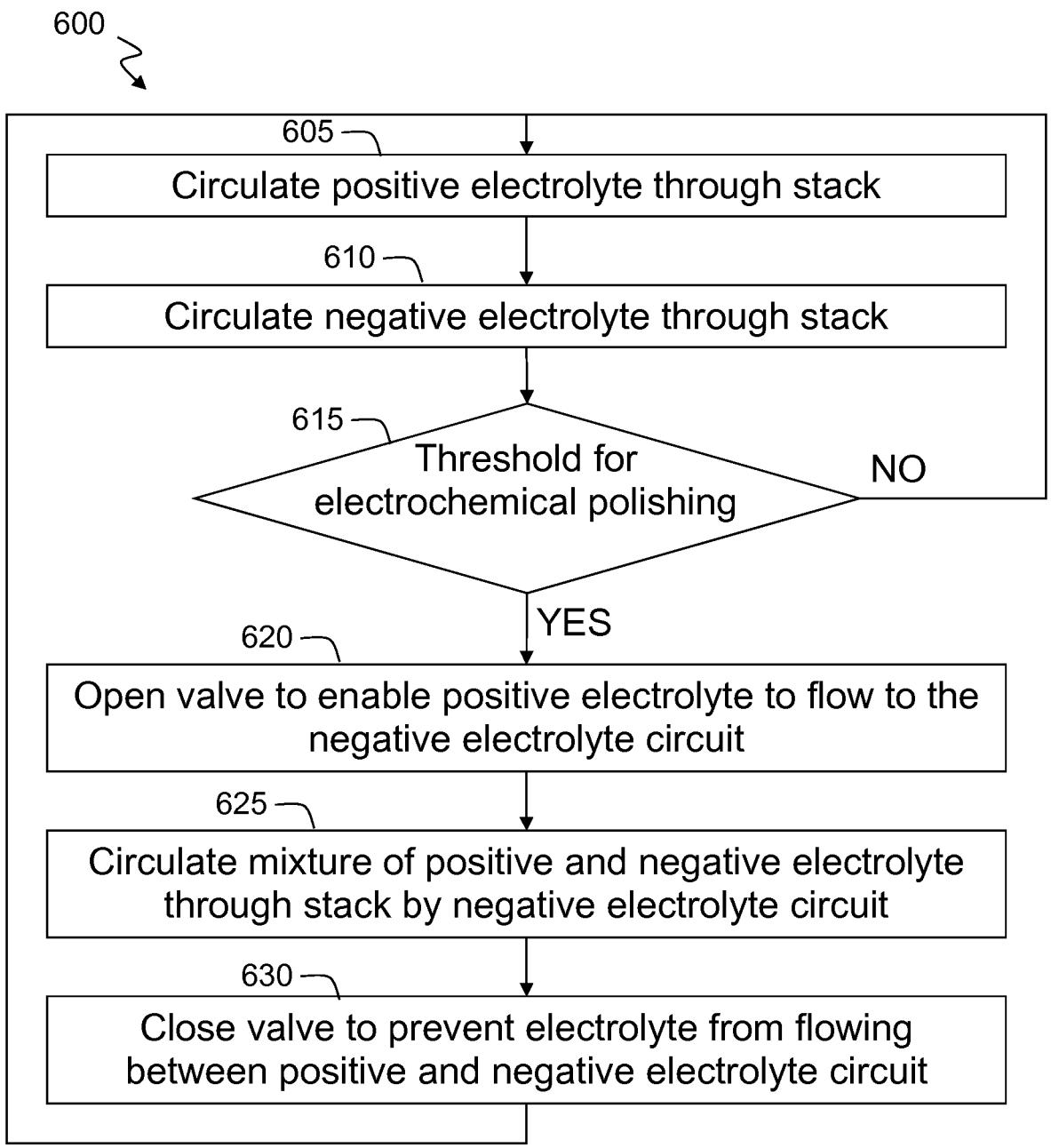
FIG. 6 illustrates a method of maintaining a battery, including electrochemically polishing the battery, according to an embodiment of the present invention.

FIG. 6 illustrates a method 600 of maintaining a battery, including electrochemically polishing the battery, according to an embodiment of the present invention.

In step 605, positive electrolyte is circulated through the stack by the positive electrolyte circuit and in step 610 negative electrolyte is circulated through the stack by the negative electrolyte circuit. This enables a voltage drop to occur across the stack, and is used in normal charge and discharge operations, as discussed above.

In step 615, it is determined if a threshold for electrochemical polishing of the flowing electrolyte battery has been reached. The threshold can comprise a time based threshold, or a charge and discharge operation threshold. In other words, the battery can be configured to be electrochemically polished periodically, e.g. once per month, or after a predetermined number of charge/discharge cycles.

If the threshold in 615 has not been reached, the method 600 continues at step 605 and 610, e.g. a normal charge or discharge operation.

If the threshold in 615 has been reached, the valve is opened in step 620 to enable the positive electrolyte to flow from the positive electrolyte circuit to the negative electrolyte circuit. As discussed above, this can be achieved by operating the positive electrolyte circuit at a higher pressure than the negative electrolyte circuit when a check valve is used.

In step 625, a mixture of positive and negative electrolyte is circulated through the stack by the negative electrolyte circuit. This will cause an electrochemical stripping of part of the stack, and in the case of a Zinc-Bromine battery, cause stripping of part of the plated zinc from the stack.

Step 625 is performed for a short period of time, or with a limited flow of positive electrolyte through the negative electrolyte circuit, to prevent full discharge of the battery. This enables dendrites and uneven plating to be removed from the stack, without discharging the battery fully.

In step 630, the valve is closed, and the method 600 is continues at step 605 and 610, e.g. a normal charge or discharge operation.

Figure 7:
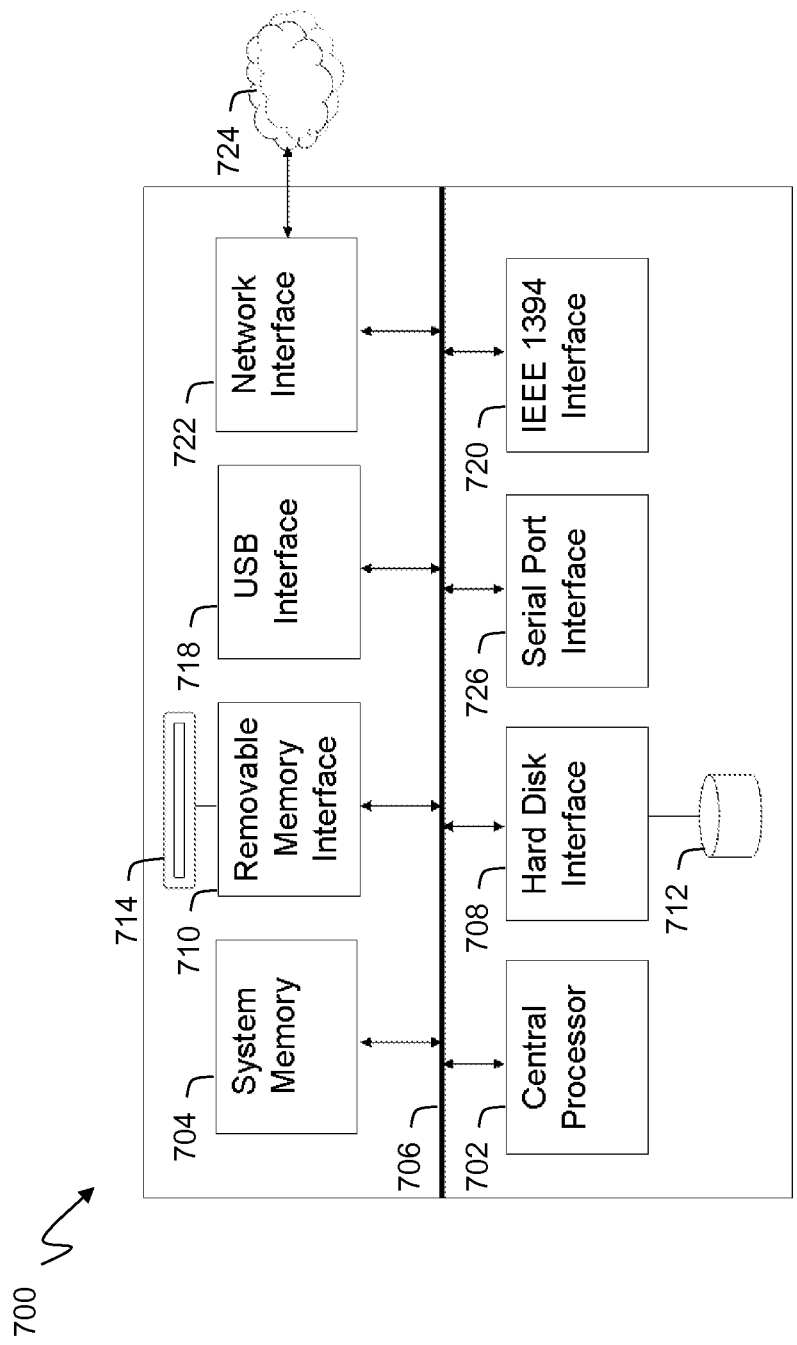
FIG. 7 diagrammatically illustrates a battery controller, according to an embodiment of the present invention.

FIG. 7 diagrammatically illustrates a battery controller 700, according to an embodiment of the present invention. The controller 700 can be identical or similar to the controller 335 of FIG. 3, the battery controller 435 of FIG. 4, and the methods 500, 600 of FIG. 5 and FIG. 6 can be implemented using the controller 700.

The controller 700 includes a central processor 702, a system memory 704 and a system bus 706 that couples various system components, including coupling the system memory 704 to the central processor 702. The system bus 706 may be any of several types of bus structures including a memory bus or memory controller, a peripheral bus, and a local bus using any of a variety of bus architectures. The structure of system memory 704 is well known to those skilled in the art and may include a basic input/output system (BIOS) stored in a read only memory (ROM) and one or more program modules such as operating systems, application programs and program data stored in random access memory (RAM).

The controller 700 can also include a variety of interface units and drives for reading and writing data. The data can include, for example, a first and second pressure values for positive and negative electrolyte pumps, details of the batteries, or any other suitable data.

In particular, the controller 700 includes a hard disk interface 708 and a removable memory interface 710, respectively coupling a hard disk drive 712 and a removable memory drive 714 to the system bus 706. A single hard disk drive 712 and a single removable memory drive 714 are shown for illustration purposes only and with the understanding that the controller 700 can include only a single memory, or alternatively several similar drives.

The controller 700 may include additional interfaces for connecting devices or sensors to the system bus 706. FIG. 7 shows a universal serial bus (USB) interface 718 which may be used to couple a device or sensor to the system bus 706. For example, an IEEE 1394 interface 720 may be used to couple additional devices to the controller 700. Examples of additional devices include pump controllers, and sensors including voltage and temperature sensors.

The controller 700 can operate in a networked environment using logical connections to one or more remote computers or other devices, such as a server, a router, a network personal computer, a peer device or other common network node, a wireless telephone or wireless personal digital assistant. The controller 700 includes a network interface 722 that couples the system bus 706 to a local area network (LAN) 724. A wide area network (WAN), such as the Internet, can also be accessed by the controller 700, for example via a modem unit connected to a serial port interface 726 or via the LAN 724. This is advantageous when, for example, the controller 700 is able to be updated, or if data is made available by the controller 700.

The operation of the controller 700 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

As discussed above, the flowing electrolyte batteries 300, 400 can comprise Zinc-Bromine flowing electrolyte batteries. Similarly, the methods 500, 600 can be performed on a Zinc-Bromine flowing electrolyte battery.

In summary, advantages of certain embodiments of the present invention include an ability to quickly and safely strip a flowing electrolyte battery. In particular, this can be achieved without any of an external maintenance bus, direct current (DC)-DC converter, or stripper circuit.

According to certain embodiments, the present invention is more robust and reduces a risk of damage to the flowing electrolyte battery as no current is required to electrically strip the battery.

According to some embodiments, the present invention can be safely used from any state of charge of the flowing electrolyte battery, including full discharge of a fully charged battery.

In addition to stripping the battery, the present invention can be used to electrochemically polish the battery, e.g. to polish a zinc plating of a zinc-bromine battery, to reduce the effect of uneven zinc deposits and dendrites.

According to certain embodiments, the discharge of the battery is controllable, enabling a desired amount of discharge or polishing to occur. In particular, a battery can be discharged a small amount, without affecting the function of the battery otherwise.

Furthermore, certain embodiments of the present invention enable overcharging to be prevented, for example if a fault has occurred in an electrical charging system, without fully discharging the battery.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A zinc-bromine flowing electrolyte battery, comprising:
a stack comprising a plurality of electrodes;
a negative electrolyte circuit coupled to the stack, for circulating negative electrolyte through the stack;
a positive electrolyte circuit coupled to the stack, for circulating positive electrolyte through the stack; and
a pressure-activated valve coupling the positive electrolyte circuit and the negative electrolyte circuit, wherein the valve includes a closed configuration that prevents flow of electrolyte between the positive electrolyte circuit and the negative electrolyte circuit, and an open configuration that enables flow of electrolyte from the positive electrolyte circuit to the negative electrolyte circuit,
wherein the negative electrolyte circuit operates at a different pressure than the positive electrolyte circuit during an electrical charge or discharge operation, and the valve is opened and closed by changes in pressure differences between the positive and the negative electrolyte circuits, and
wherein, in the open configuration, the valve prevents flow of electrolyte from the negative electrolyte circuit to the positive electrolyte circuit.

2. The battery of claim 1, wherein the valve comprises a check-valve.

3. The battery of claim 1, wherein the valve is electrically actuated.

4. The battery of claim 1, further comprising a pressure regulator, for controlling a pressure of at least one of the positive electrolyte circuit and the negative electrolyte circuit.

5. The battery of claim 1, wherein during an electrical charge or discharge operation the negative electrolyte circuit is configured to operate at a higher pressure than the positive electrolyte circuit, and the valve is configured such that it is closed by the higher pressure of the negative electrolyte circuit.

6. The battery of claim 1, wherein the positive electrolyte circuit and the negative electrolyte circuit comprise positive and negative electrolyte reservoirs, respectively.

7. The battery of claim 6, further comprising an overflow channel between the positive and negative electrolyte reservoirs that enables electrolyte to overflow from one of the positive and the negative electrolyte reservoirs to another of the positive and the negative electrolyte reservoirs.

8. The battery of claim 1, further comprising a charging module, for charging the flowing electrolyte battery.

9. The battery of claim 1, further comprising a battery control module for detecting an overcharging of the flowing electrolyte battery, the module configured to open the valve when overcharging is detected.

10. The battery of claim 9, wherein the battery control module is configured to open the valve by changing a pressure in one or more of the negative electrolyte circuit and the positive electrolyte circuit.

11. The battery of claim 9, wherein the battery control module is configured to detect an overcharge current, and control the valve to chemically discharge the flowing electrolyte battery at a rate corresponding to the overcharge current.

12. The battery of claim 9, wherein the battery control module activates electrochemical polishing of the stack of the flowing electrolyte battery.

13. The battery of claim 9, wherein the battery control module is configured to periodically open the valve to chemically discharge the battery partially.

* * * * *